United States Patent
Lee

(10) Patent No.: US 7,113,397 B2
(45) Date of Patent: Sep. 26, 2006

(54) ELECTRONIC DEVICE HAVING A TILTING STAND

(75) Inventor: Seong-Ho Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 10/787,961

(22) Filed: Feb. 27, 2004

(65) Prior Publication Data

US 2004/0228081 A1 Nov. 18, 2004

(30) Foreign Application Priority Data

May 15, 2003 (KR) .................. 10-2003-0031021

(51) Int. Cl.
*H05K 5/00* (2006.01)
*A47B 97/00* (2006.01)

(52) U.S. Cl. .................. 361/683; 361/681; 248/919; 312/223.2

(58) Field of Classification Search .............. 248/917, 248/918, 919, 122.1, 921–923, 688; 361/683, 361/681; 108/28, 29; 400/682; 16/235, 16/334, 221; 312/223.2

See application file for complete search history.

(56) References Cited

U.S. PATENT DOCUMENTS

| 4,925,329 | A | * | 5/1990 | Chuang | 403/93 |
| 5,107,401 | A | * | 4/1992 | Youn | 361/683 |
| 5,267,123 | A | * | 11/1993 | Boothroyd et al. | 361/681 |
| 5,293,300 | A | * | 3/1994 | Leung | 361/683 |
| 5,297,003 | A | * | 3/1994 | Nomura et al. | 361/680 |
| 5,438,475 | A | * | 8/1995 | Bradley | 361/683 |
| 5,469,327 | A | * | 11/1995 | Cheng | 361/680 |
| 5,642,258 | A | * | 6/1997 | Barrus et al. | 361/683 |
| 5,721,668 | A | * | 2/1998 | Barrus et al. | 361/683 |
| 5,901,035 | A | * | 5/1999 | Foster et al. | 361/683 |
| 6,002,583 | A | * | 12/1999 | Shoji et al. | 361/683 |
| 6,016,248 | A | | 1/2000 | Anzai et al. | 361/683 |
| 6,053,589 | A | * | 4/2000 | Lin | 312/271 |
| 6,078,496 | A | * | 6/2000 | Oguchi et al. | 361/683 |
| 6,097,592 | A | * | 8/2000 | Seo et al. | 361/683 |
| 6,301,101 | B1 | | 10/2001 | Anzai et al. | 361/683 |
| 6,385,039 | B1 | * | 5/2002 | Chiang et al. | 361/683 |
| 6,452,795 | B1 | * | 9/2002 | Lee | 361/686 |
| 6,498,721 | B1 | | 12/2002 | Kim | 361/681 |
| 6,535,378 | B1 | * | 3/2003 | Oguchi et al. | 361/683 |
| 6,612,668 | B1 | * | 9/2003 | Doan | 312/223.2 |
| 6,768,637 | B1 | * | 7/2004 | Amemiya | 361/683 |
| 6,798,646 | B1 | * | 9/2004 | Hsu | 361/681 |
| 2004/0227045 | A1 | * | 11/2004 | An et al. | 248/278.1 |
| 2004/0228081 | A1 | * | 11/2004 | Lee | 361/683 |

FOREIGN PATENT DOCUMENTS

CN 1403889 A 3/2003
KR 1020030081761 10/2003

OTHER PUBLICATIONS

Chinese Office Action dated Mar. 17, 2006.

\* cited by examiner

*Primary Examiner*—Lisa Lea-Edmonds
*Assistant Examiner*—Zachary Pape
(74) *Attorney, Agent, or Firm*—Fleshner & Kim LLP.

(57) ABSTRACT

An electronic device, such as a portable electronic device, is provided which includes a main body, a display unit rotatably connected to the main body on which information is displayed, and a tilting stand rotatably connected to a back wall of the main body and configured to adjust a height level of the rear end of the main body. The main body can be used in an inclined state by utilizing the tilting stand to adjust a height level of the rear end of the main body.

24 Claims, 11 Drawing Sheets

ELECTRONIC DEVICE HAVING A TILTING STAND

BACKGROUND OF THE INVENTION

1. Field of the Invention

The invention relates to an electronic device, and more particularly, to an electronic device having a tilting stand.

2. Background of the Related Art

FIGS. 1A to 1C are schematic perspective views of a related art portable electronic device including a related art swivel hinge. Referring to FIGS. 1A to 1C, a variety of parts, such as a main board and a hard disk drive, are installed within a main body 1. An input unit 3, such as a keyboard, is provided on a top surface of the main body 1. A display unit 5, such as a liquid crystal display (LCD), is connected to an end of the main body 1.

The display unit 5 can be pivoted to be folded or unfolded with respect to the main body 1, as shown in FIGS. 1B and 1C, and can also be rotated horizontally as viewed from the front of the main body 1, as shown in FIG. 1A. This is possible because the main body 1 and the display unit 5 are connected to each other by a swivel hinge assembly 7.

The swivel hinge assembly 7 allows the display unit 5 to be rotated horizontally about a rotary plate 7r. An end of a connection plate 7c is connected to the rotary plate 7r. A center of rotation in a fore and aft direction is placed along a tangential direction of a circular are defined by and at the periphery of the rotary plate 7r.

In such related art, the display unit 5 is pivoted in a fore and aft direction as viewed from the front of the main body 1, that is, pivoted about the horizontal axis of rotation on the one end of the connection plate 7c to be folded or unfolded with respect to the main body 1. At the same time, the display unit 5 is rotated horizontally about a vertical axis of rotation provided on the rotary plate 7r.

Therefore, the display unit 5 can be used in variously rotated states. More particularly, the display unit 5 can be used in a state in which a rear surface thereof is in contact with the top surface of the main body 1, as shown in FIG. 1C. Since the display unit 5 can be used in such a state, it may also be used as a tablet computer.

However, there are the following problems in the related art.

First of all, there is no structure provided for placing the keyboard 3 in an inclined state on a surface when performing a keying operation through the keyboard 3. Therefore, there is a problem that it is relatively difficult to perform the keying operation through the keyboard 3.

Further, due to the rotation of the display unit 5, additional parts cannot be installed in a region on the top surface of the main body 1, other than the area in which the keyboard 3 is installed. Therefore, there is another problem in that the efficiency of space use for the portable electronic device employing the swivel hinge assembly is lower.

In addition, in a case in which the display unit 5 is configured as a tablet computer, no storage space is provided for storing a stylus pen for input to the tablet computer. Also, there is a further problem in that an available interior space of the main body 1 or display unit 5 is inevitably limited.

Finally, even though the related art portable electronic device may be completely folded, the display unit 5 of the electronic device can be easily rotated horizontally with respect to the main body 1. That is, the display unit 5 may be rotated with respect to the main body 1 even when the portable electronic device is being carried. Therefore, there is a still further problem in that it is inconvenient to carry the portable electronic device. To avoid this inconvenience, the portable electronic device should be designed such that a relatively large force is required to rotate the display unit 5 in the horizontal direction. In such a case, however, the user's inconvenience may be further increased.

SUMMARY OF THE INVENTION

An object of the invention is to substantially solve at least one or more of the above problems and/or disadvantages, in whole or in part, and to provide at least the advantages described hereinafter.

In order to achieve at least the above objects, in whole or in part, and in accordance with the purposes of the invention, as embodied and broadly described, there is provided an electronic device in accordance with an embodiment of the invention comprising a main body, a display unit rotatably connected to the main body on which information is displayed, and a tilting stand rotatably connected to a back wall of the main body and configured to adjust a height level of the rear end of the main body.

To further achieve at least the above objects, in whole or in part, and in accordance with the purposes of the invention, as embodied and broadly described, there is provided an electronic device in accordance with an embodiment of the invention comprising a lower body, an upper body which is connected to the lower body and which can be opened or closed, a stand hingedly connected to a back wall of the lower body, wherein the stand is pivoted to adjust a height level of the lower body.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Hereinafter, an electronic device according to embodiments of the invention will be described in detail with reference to the accompanying drawings. The following detailed description is directed to a portable electronic device, more particularly, a combined notebook and tablet computer. However, the invention can also be applied to a variety of other electronic devices, including portable electronic devices, such as mobile phones, for which it is desirable that a display unit and main body thereof be folded to face each other and unfolded to move away from each other.

Figure 2A:
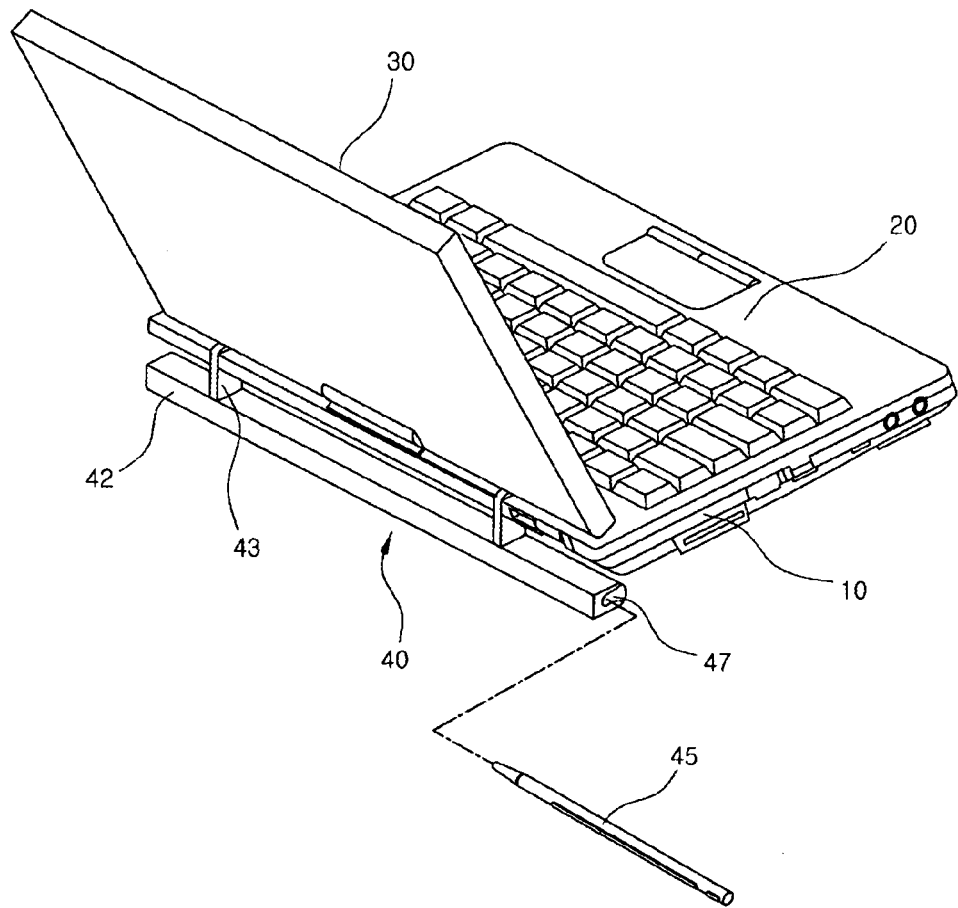
FIG. 2A is a schematic rear perspective view of a portable electronic device according to an embodiment of the invention.
Figure 3:
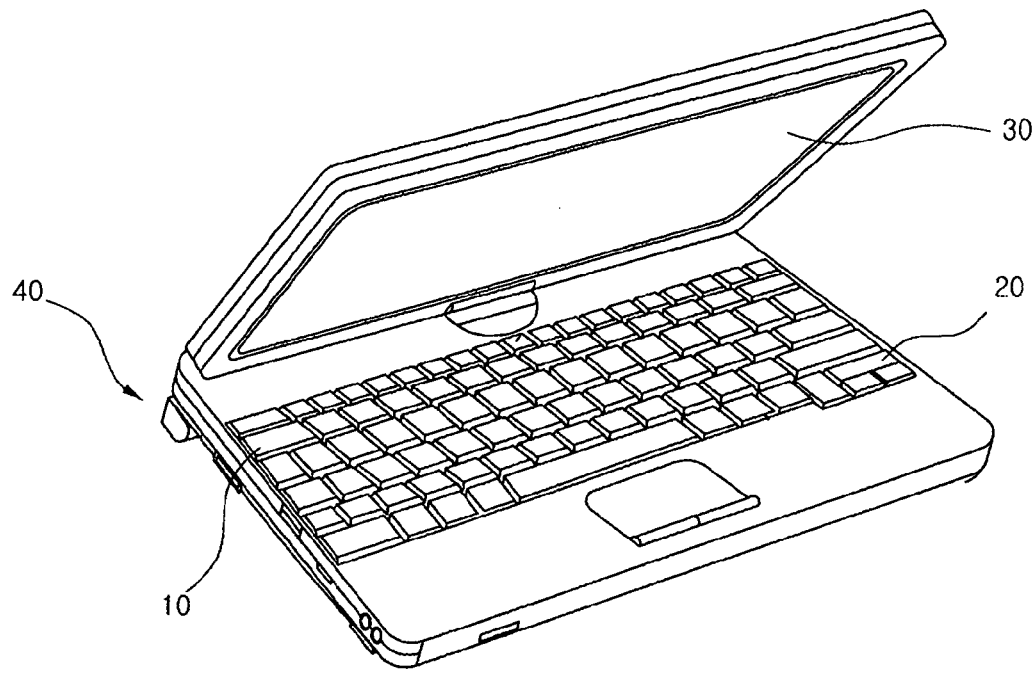
FIG. 3 is a schematic front perspective view of a portable electronic device according to an embodiment of the invention.
Figure 4:
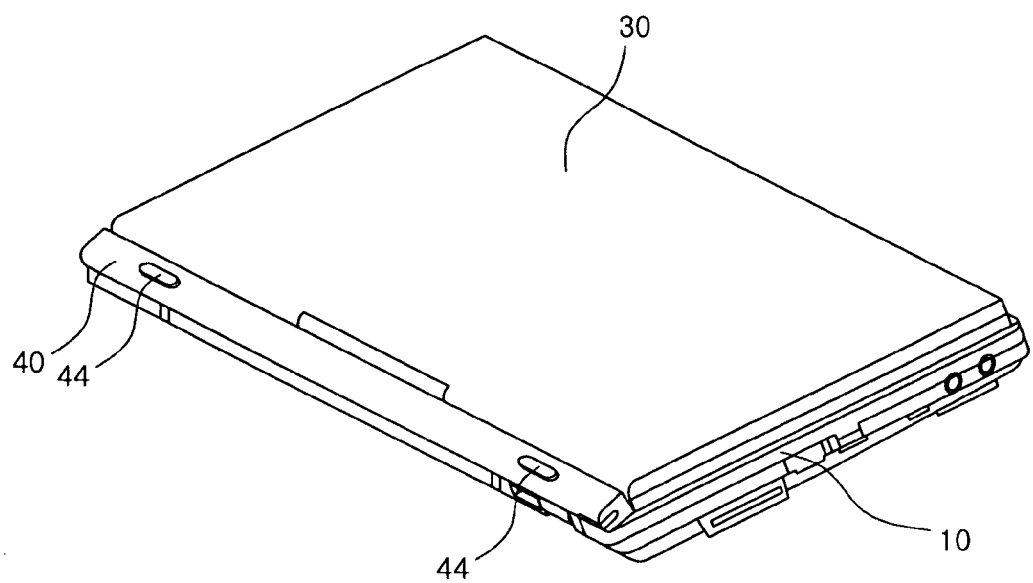
FIG. 4 is a schematic perspective view of the portable electronic device of FIG. 3 in a folded state according to an embodiment of the invention.
Figure 5:
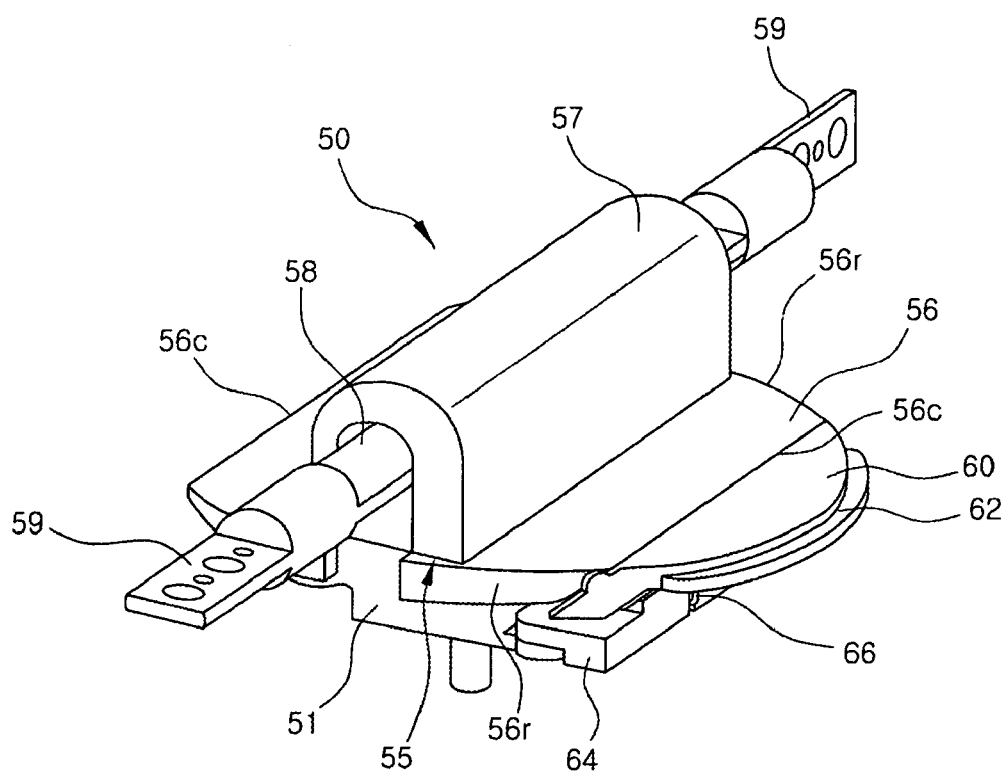
FIG. 5 is a schematic perspective view of a swivel hinge assembly according to an embodiment of the invention.
Figure 6:
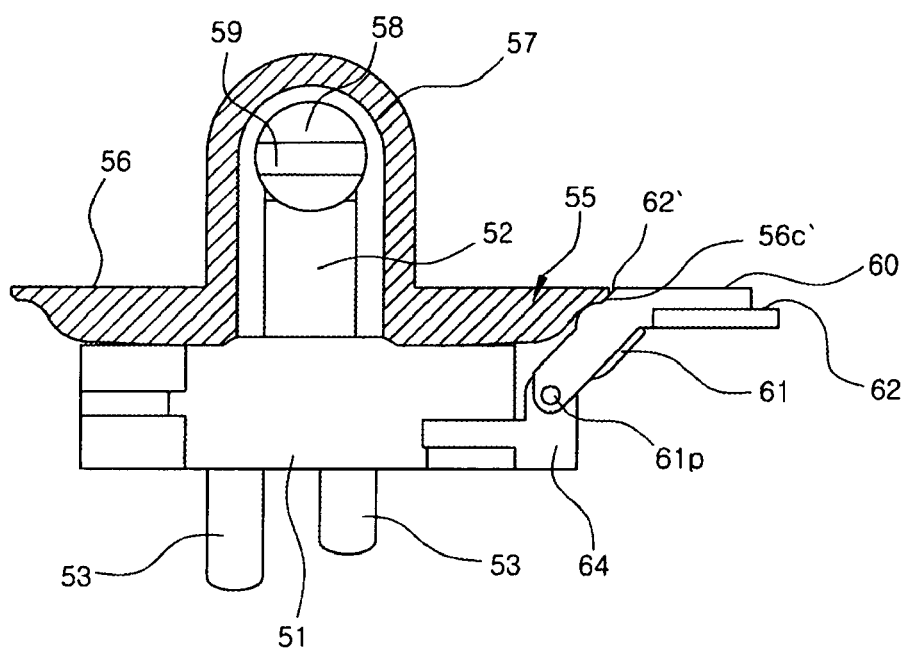
FIG. 6 is a schematic side view of the swivel hinge assembly of FIG. 5.

FIG. 2A is a schematic rear perspective view of a portable electronic device according to an embodiment of the invention. FIG. 3 is a schematic front perspective view of a portable electronic device according to an embodiment of the invention. FIG. 4 is a schematic perspective view of the portable electronic device of FIG. 3 in a folded state. FIG. 5 is a schematic perspective view of a swivel hinge assembly according to an embodiment of the invention, and FIG. 6 is a schematic side view of the swivel hinge assembly of FIG. 5.

Referring to FIGS. 2A–6, the portable electronic device according to an embodiment of the invention includes a main body 10 and a display unit 30 that may be folded or unfolded with respect to each other, similar to a so-called notebook computer. An input device 20, such as a keyboard having a plurality of keys for inputting characters, numerals, symbols, etc., is provided on a top surface of the main body 10. Another input unit, such as a touchpad or pointing stick, may also be provided on the top surface of the main body 10. Parts, including a main board, a hard disk drive, etc., may be installed within the main body 10.

The display unit 30 may be, for example, a touch screen or liquid crystal display (LCD). In various embodiment of the invention, the display unit 30 is configured in the form of a tablet computer. Further, the display unit 30 may include a touch screen such that input can be made through the display unit itself.

In addition, the main body 10 and the display unit 30 can be variously combined with each other for various functions. For example, similar to a notebook-computer, a main board, a hard disk drive, etc. may be contained in the main body 10 and the display unit 30 may have only a display function without an input function. Alternatively, the display unit 30 may be configured in the form of a tablet computer and the main body 10 may be provided with an additional input unit and without a main board.

Further, a tilting stand 40 may be provided at a rear end of the main body 10 where the main body 10 and the display unit 30 are connected with each other. The tilting stand 40 allows the rear end of the main body 10 to be positioned relatively higher than a front end thereof, which results in easier keying operations.

The titling stand 40 may comprise a support bar 42, as shown in FIG. 2A, and is selectively supported on a surface on which the main body 10 is positioned. The tilting stand 40 may have a length corresponding to a lateral length of the main body 10. At least one hinge connection bar 43 extends substantially vertically from the support bar 42 and is hingedly connected to the main body 10, as shown in FIG. 2A. One end of the hinge connection bar 43 is pivotally connected to the main body 10 through a hinge (not shown) and the other end thereof is connected to the support bar 42.

A portion of the main body 10 to which the hinge connection bar 43 is hingedly connected corresponds to a relatively lower portion of the rear end of the main body 10. In other words, it is preferable that the hinge connection bar 43 be hingedly connected to the main body 10 at a position below a middle of a height of the main body 10. In this way, the support bar 42 can be seated on an upper portion of the rear end of the main body 10 when not in use, as shown in FIG. 4, and can also support the rear end of the main body 10 in a raised position when it is supported on a surface, such as a desk top, the ground, or floor.

In the embodiment shown in FIG. 2A, the at least one hinge connection bar 43 includes two or more hinge connection bars 43 provided based on the length of the support bar 42. The support bar 42 is hingedly connected to the main body 10 such that the titling stand 40 can be rotated only when a force greater than a specific value is applied thereto. In this way, the titling stand 40 cannot be inadvertently rotated due to a small external force applied thereto during its use.

Figure 2B:
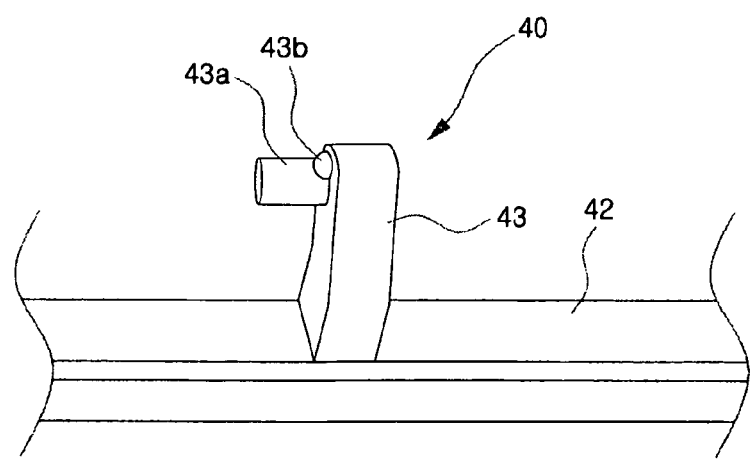
FIG. 2B is a rear view of a portion of a tilting stand according to an embodiment of the invention.

For example, as shown in FIG. 2B, the hinge connection bar 43 may include a pivot shaft 43a. The pivot shaft 43a is configured to mate with an aperture provided on a rear portion of the main body 10 or in a connector 48, such as that shown in FIG. 2C.

Figure 2C:
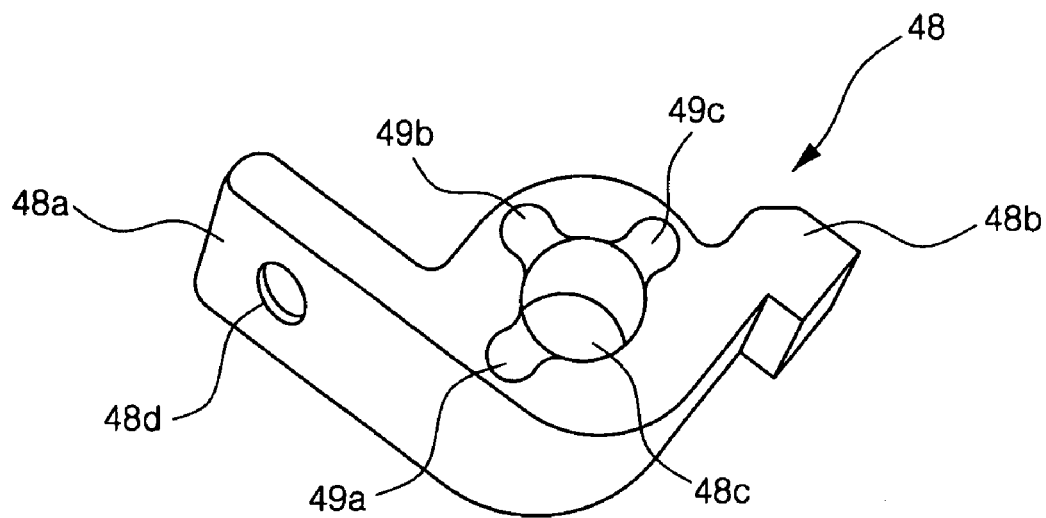
FIG. 2C is a perspective view of a connector according to an embodiment of the invention.
Figure 2D:
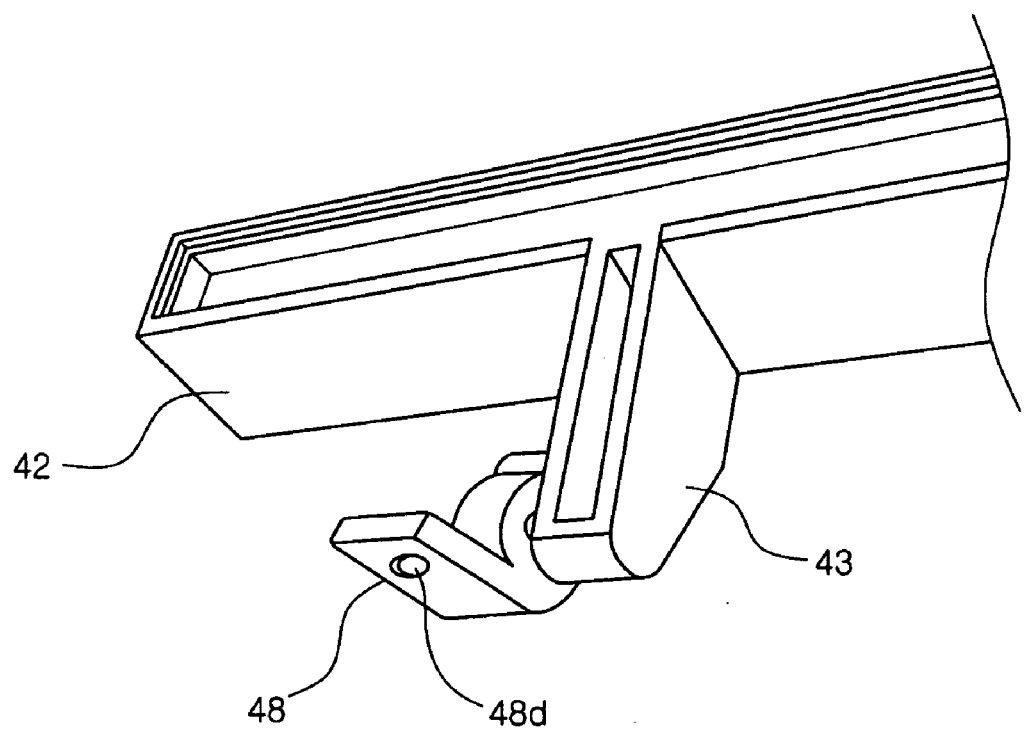
FIG. 2D is a perspective view showing interaction of the tilting stand of FIG. 2B and the connector of FIG. 2C according to an embodiment of the invention.
Figure 2E:
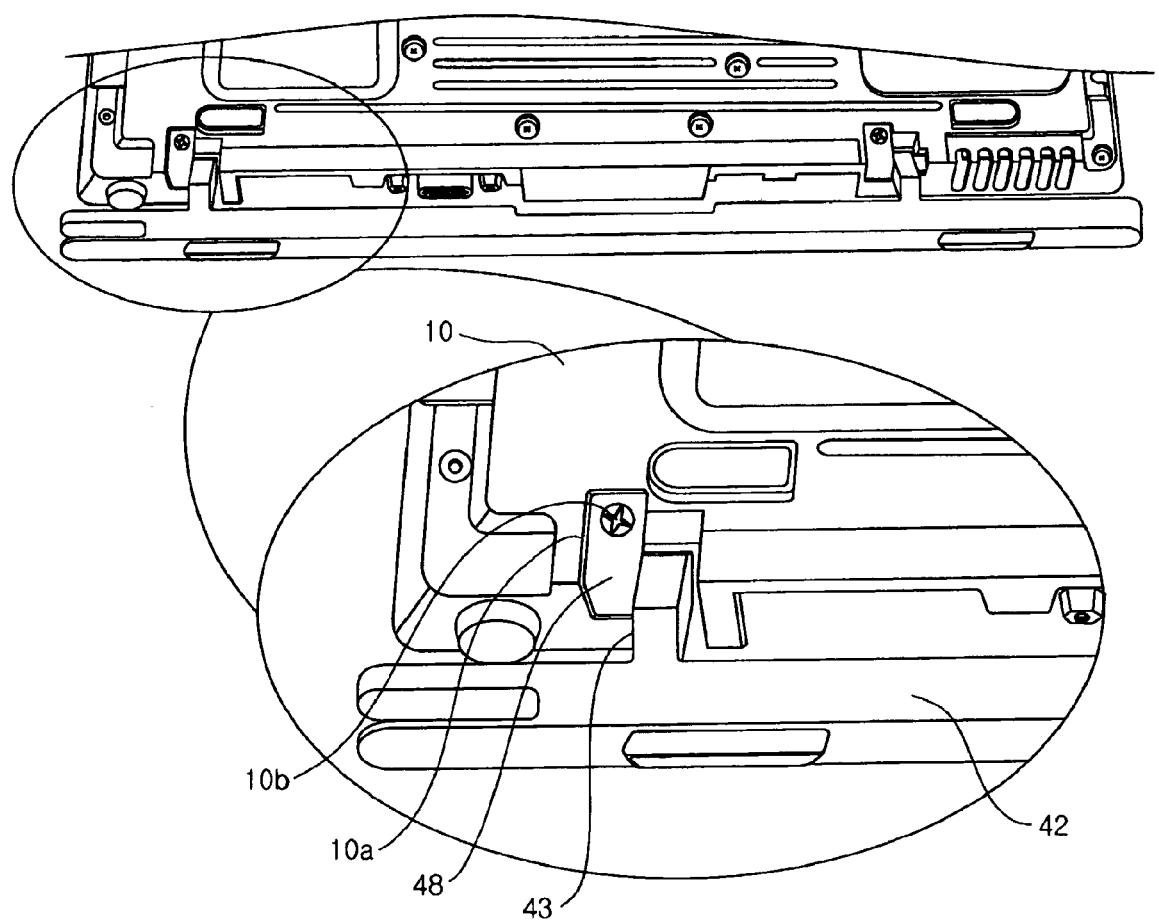
FIG. 2E is a bottom view of a main body of a portable electronic device according to an embodiment of the invention.

The connector 48 shown in FIG. 2C may be provided either attached to or integral with a rear portion of the main body 10. In the embodiment of FIGS. 2C–2E, the connector 48 is configured to mate with an aperture 10a formed in the main body 10. The connector 48 further includes an aperture 48d configured to allow the connector to be attached to the main body 10 via a screw 10b, as well as an aperture 48c configured to mate with the pivot shaft 43a of the connection bar 43, as shown in FIG. 2D. The connector of FIG. 2C additionally includes an arm 48b in the shape of an extended projection configured to mate with the aperture 10a formed in the main body 10.

In the embodiment of FIGS. 2B, the connection bar 43 is provided with a protrusion 43b configured to mate with grooves 49a, 49b, 49c provided on the connector 48, as shown in FIG. 2C. When the tilting bar 40 is rotated with respect to the main body 10, the tilting bar 40 rotates until the protrusion 43b mates with one of groove 49a, 49b, 49c. For example, in the case that the protrusion 43b mates with groove 49b, the tilting bar 40 is held in place by the engagement of the protrusion 43b with the groove 49b until a rotating force is applied to the tilting bar 40 sufficient to dislodge the protrusion 43b from the groove 49b. In such a case, the tilting bar 40 is easily rotated until the protrusion 43b mates with another of the grooves, such as groove 49a or 49c. In this way, the position of the tilting bar 40 is maintained by the engagement of the protrusion 43b with a respective groove 49a, 49b, 49c until a sufficient force is applied to rotate the tilting stand 40.

The titling stand 40 provided on the rear end of the main body 10 is securely seated on the upper portion of the rear end of the main body 10, when it is not in use, as shown in FIG. 4. When the tilting stand is in use, that is, when the main body 10 is used in an inclined state, the titling stand 40 is supported on a surface, such as a desk top, the floor, or ground, as shown in FIG. 2A.

In the embodiment of FIG. 2A, the titling stand 40 is formed with a pen reception portion 47 into which a stylus pen 45 may be inserted. The pen reception portion 47 may be formed in a longitudinal direction of the support bar 42 with an entrance hole provided on an end of the titling stand 40, as shown in FIG. 2A. The stylus pen 45, which is inserted into the pen reception portion 47, is needed when the display unit 30 is configured in the form of a tablet computer.

A shock-absorbing member 44 is formed on a bottom surface of the support bar 42. The shock-absorbing member 44 contacts with a surface on which the main body 10 is supported and performs a shock-absorbing operation. The shock-absorbing member may be, for example, an elastic member made of, for example, rubber, plastic, etc.

FIGS. 5 and 6 show an embodiment of a swivel hinge assembly 50 for connecting the main body 10 and the display unit 30 according to an embodiment of the invention. The swivel hinge assembly 50 allows the display unit 30 to be vertically and horizontally rotated, as viewed from a front of a main body 10.

In this embodiment, the swivel hinge assembly 50 comprises a first frame 51 that is mounted on the main body 10, and a second frame 55 that is rotated relative to the first frame 51 and connected to the display unit 30 to move together with the display unit 30. The first frame 51 is fixed to the main body 10 and is provided with a substantially vertically extending rotary shaft 52 on a top surface thereof The rotary shaft 52 functions as a substantially vertical axis of rotation about which the display unit 30 is substantially horizontally rotated.

A plurality of fixing pins 53 may be formed to protrude from a bottom surface of the first frame 51. The fixing pins 53 are configured to be fitted into corresponding recesses in the main body 10 so that the swivel hinge assembly 50 can be firmly fixed to the main body 10.

The second frame 55 is rotated in a substantially horizontal plane with respect to the first frame 51 about the rotary shaft 52. The second frame 55 is provided with a base 56. In this embodiment, the base 56 is in the form of a roughly disc-shaped base having rounded portions 56r with a predetermined radius of curvature and straight cutout portions 56c. The cutout portions 56c may be symmetrically formed on opposite sides of the base 56. In other words, the base 56 may take the form of a disc, opposite ends of which are cut out, as viewed from above in a plane view.

As viewed from the front of the main body 10, the cutout portions 56c do not protrude beyond the rear end of main body 10, but rather define a portion of the rear end of the main body 10, in a state in which the display unit 30 is not rotated or has been rotated 180 degrees in a substantially horizontal direction.

A protruding housing 57 is formed on a top surface of the base 56. In this embodiment, the housing 67 extends across a center of the top surface of the base 56 and in parallel with the cutout portions 56c. Further, the rotating housing 57 has a rounded external surface. Both ends of the housing 57 are open and the interior of the housing can be penetrated in a longitudinal direction. The housing 57 is configured to be placed into a corresponding recess in the display unit 30.

The rotary shaft 52 is positioned at a center of the housing 57. Further, a substantially horizontally extending rotary shaft 58 is rotatably installed within the interior of the housing 57, as shown in FIG. 5, between a top end of the rotary shaft 52 and an inner surface of the housing 57. The rotary shaft 58 functions as a substantially horizontal axis of rotation about which the display unit 30 is substantially vertically rotated in the fore and aft directions. Connection bars 59 for connection with the display unit 30 are provided on both ends of the rotary shaft 58. The connection bars 59 are fastened to the display unit 30 with fastening means, such as screws, so that both the rotary shaft 58 and the display unit 30 can be simultaneously rotated with respect to the second frame 55. It is preferable that the display unit 30 can be rotated about the rotary shaft 58 only when a predetermined force is applied thereto.

The second frame 55 is fastened to the display unit 30 via the rotary shaft 58, while the base 56 is positioned adjacent the main body, for example, in an opening 70 provided in the main body 10, which allows the second frame 55 to be smoothly rotated with respect thereto. The opening 70 preferably has a diameter corresponding to that of the base 56. When the display unit 30 is not rotated or has been rotated 180 degrees, a region of the opening 70 adjacent to the cutout portion 56c is opened due to the presence of the cutout portions 56c.

A cover plate 60 is provided to cover the opened region of the opening 70. The cover plate 60 may be connected to the first frame 51, as shown in FIG. 6. The cover plate 60 is received into the main body 10 when the second frame 55 rotates. When the display unit 30 is not rotated or has been rotated 180 degrees, the opened region of the opening 70 is covered by the cover plate 60. In this embodiment, the cover plate 60 takes the form of an arc of which a chord length corresponds to a length of the cutout portion 56c of the semicircular base 56.

A connection leg 61 extends downward from the cover plate 60. A tip end of the connection leg 61 is pivotally attached to a supporting portion 64 of the first frame 51 by a hinge pin 61p. The supporting portion 64 may be integrally formed with the first frame 51.

The cover plate 60 may be formed with a stepped portion 62 along the rounded periphery thereof, as shown in FIG. 6. The stepped portion 62 is placed into the main body 10, and thus, a top surface of the cover plate 60 is at the same level as that of the base 56 when the opened region is covered with the cover plate 60. An inclined guide plane 62' may be formed at a region on the cover plate 60 corresponding to the cutout portion 56c. The inclined guide plane 62' may be formed inclined downward toward the cutout portion 56c. The cutout portion 56c also may have a corresponding inclined plane 56c'.

An elastic force is exerted on the cover plate 60 by means of an elastic member 66 fixed to the supporting portion 64. The elastic member 66 exerts the elastic force on the cover plate 60 in such a direction that the top surface of the cover plate 60 is at the same height level as that of the base 56.

Hereinafter, the operation of a portable electronic device according to embodiments of the invention will be described in detail.

FIG. 4 shows a state in which the main body 10 and the display unit 30 are folded so as to face each other. This state corresponds to a state in which a user carries the electronic device.

FIGS. 2A and 3 show a state in which the display unit 30 has been vertically rotated about the rotary shaft 58. This state corresponds to a state in which a user may perform an input operation through the input device 20. The user may also perform the input operation by bringing the stylus pen 45 into contact with a top surface of the display unit 30. Thereafter, the stylus pen 45 may be inserted into the pen reception portion 47 which is opened toward one end of the tilting stand 40. Since the tilting stand 40 has no components therein, the pen reception portion 47 can be easily formed in the tilting stand 40.

Figure 7:
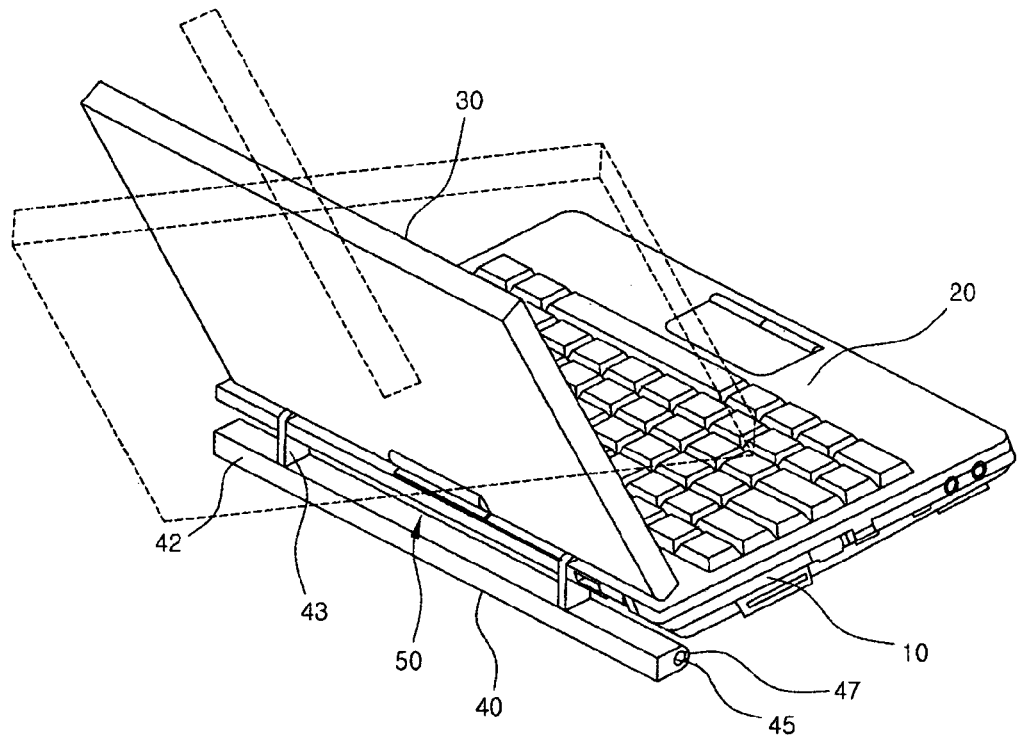
FIG. 7 is a schematic perspective view showing a state in which a display unit is rotated horizontally in a portable electronic device according to an embodiment of the invention.

FIG. 7 shows a state in which the display unit 30 has been rotated about the rotary shaft 58 in the aft direction and then rotated about the rotary shaft 52 in a horizontal plane. The rotation of the display unit 30 about the rotary shaft 58 can be made up to about 180 degrees, whereas the rotation about the rotary shaft 52 can be made up to 360 degrees.

The tilting stand 40 may be supported on a surface when the user intends to use the input device 20 of the main body 10, as shown in FIGS. 2A and 3. That is, the rear end of the main body 10 is relatively raised and the input device 20 can be used in an inclined state.

Accordingly, the user can easily perform, for example, keying operations through the input device.

Figure 8:
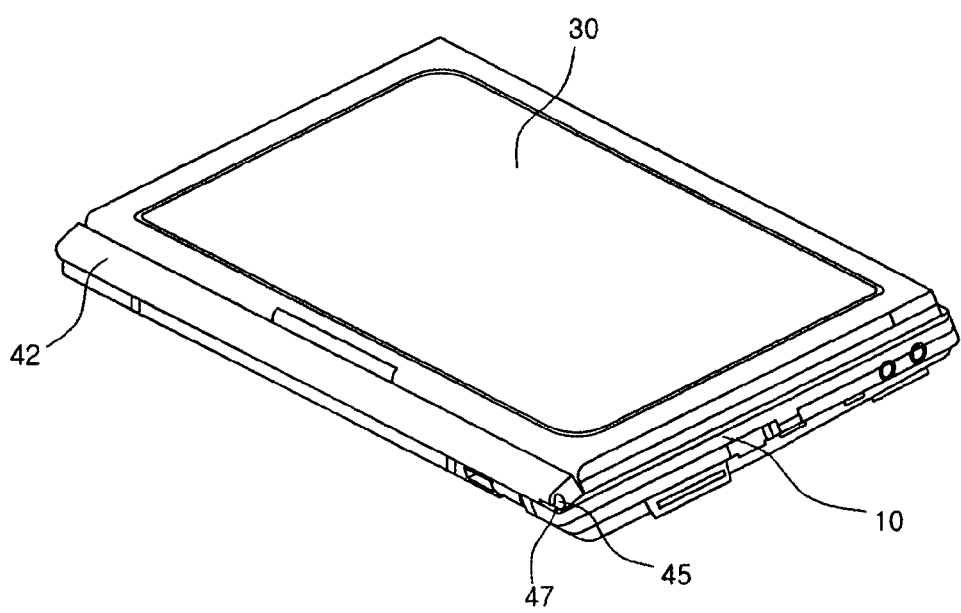
FIG. 8 is a schematic perspective view showing a state in which a rear surface of the display unit is securely seated onto a top surface of a main body in a portable electronic device according to an embodiment of the invention.

If the tilting stand 40 is in a state as shown in FIG. 4 or FIG. 8, the titling stand 40 functions to prevent the display unit 30 from being inadvertently or unnecessarily rotated about the rotary shaft 52. That is, since the tilting stand 40 is securely seated on the rear end of the main body 10 and holds one end of the display unit 30 in place, the display unit 30 can be prevented from being arbitrarily rotated.

Next, the operation of the cover plate 60 will be explained. When the display unit 30 is rotated about the rotary shaft 52, the cover plate 60 is operated, while when the display unit 30 is not rotated or has been rotated 180 degrees, as shown in FIGS. 2A and 3, the cover plate 60 is substantially at the same level as the top surface of the main body 10. This state is also shown in FIGS. 5 and 6, and thus, corresponds to a state in which the opening 70 in the main body 10 with the swivel hinge assembly 50 installed therein is covered with the cover plate 60.

Figure 9A:
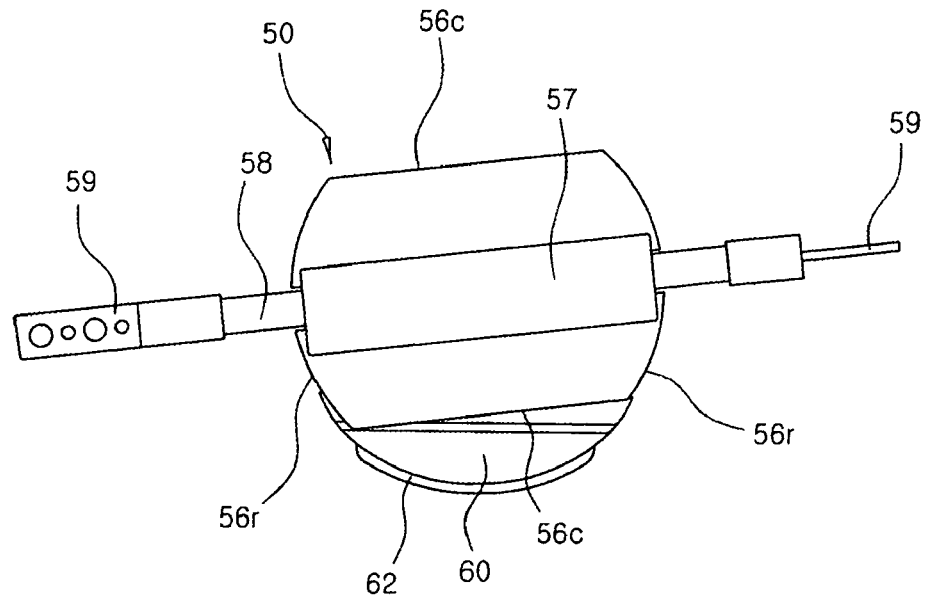
FIGS. 9A to 11B sequentially show the operation of a cover plate of a swivel hinge assembly according to an embodiment of the invention.
Figure 9B:
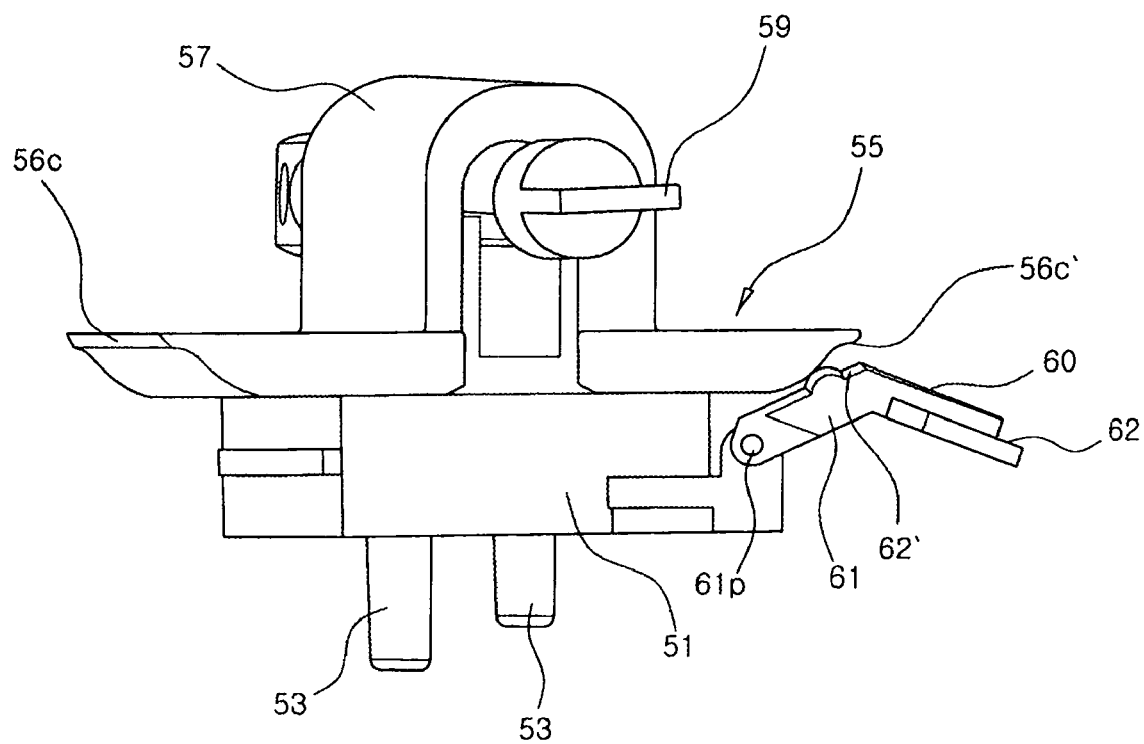

The cover plate 60 is raised and/or lowered by the rotation of the display unit 30, that is, rotation of the base 56. When the display unit 30 begins to rotate about the rotary shaft 52 from the state shown in FIGS. 2A and 3, the inclined plane 56c' of the cutout portion 56c, which was in contact with the inclined guide plane 62' of the cover plate 60, begins to push the inclined guide plane 62' of the cover plate 60. Thus, the cover plate 60 begins to be pivoted on the hinge pin 61p and to descend while overcoming the elastic force from the elastic member 66. This state is illustrated in FIGS. 9A and 9B.

Figure 1A:
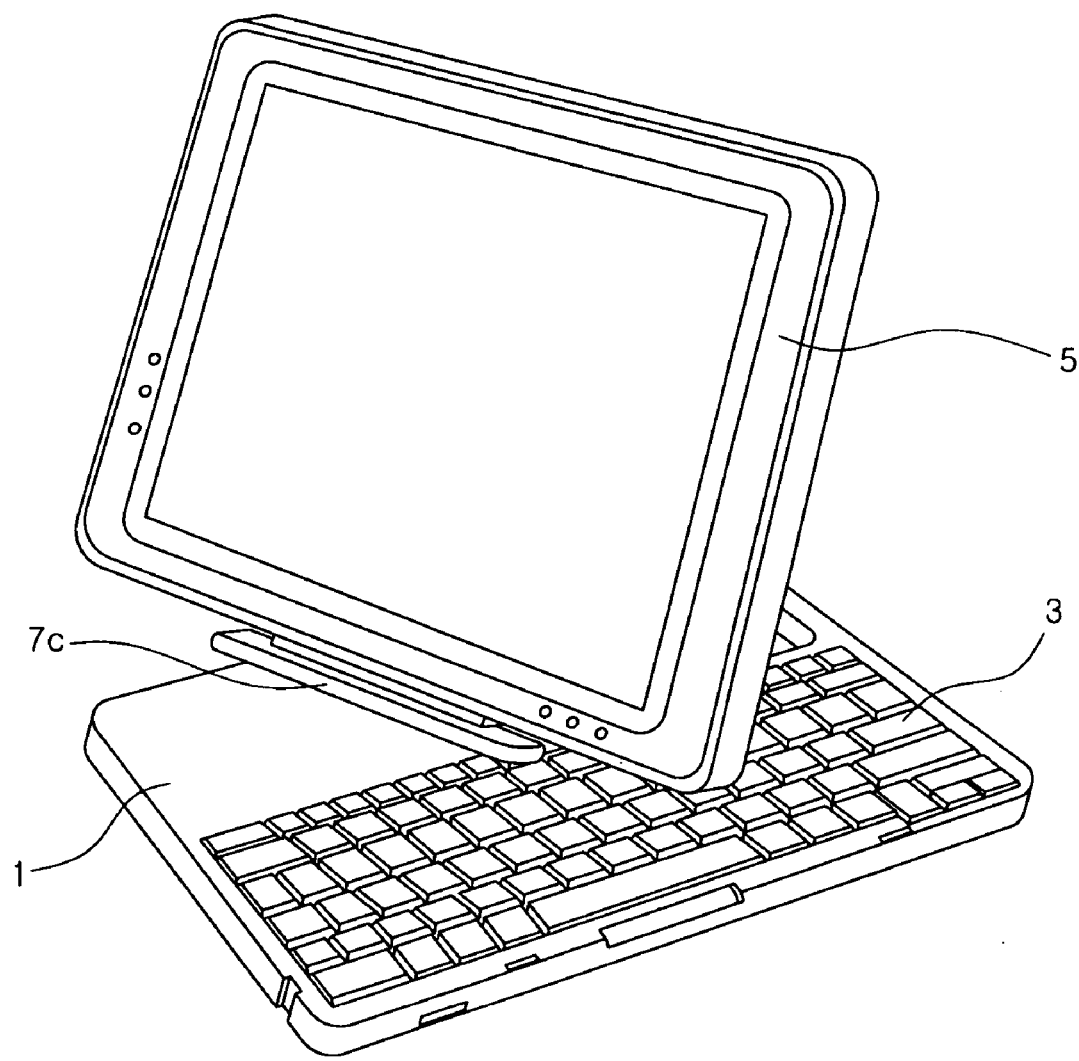
FIG. 1A is a schematic perspective view of a related art portable electronic device having a related art swivel hinge assembly.
Figure 1B:
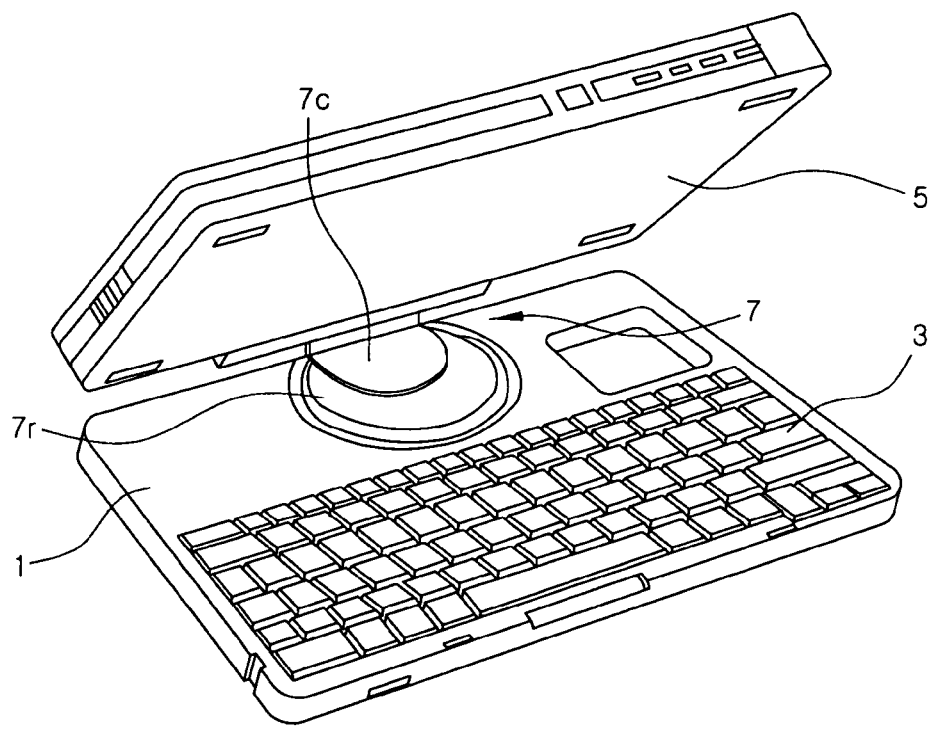
FIG. 1B is a schematic perspective view of a related art portable electronic device having a related art swivel hinge assembly.
Figure 1C:
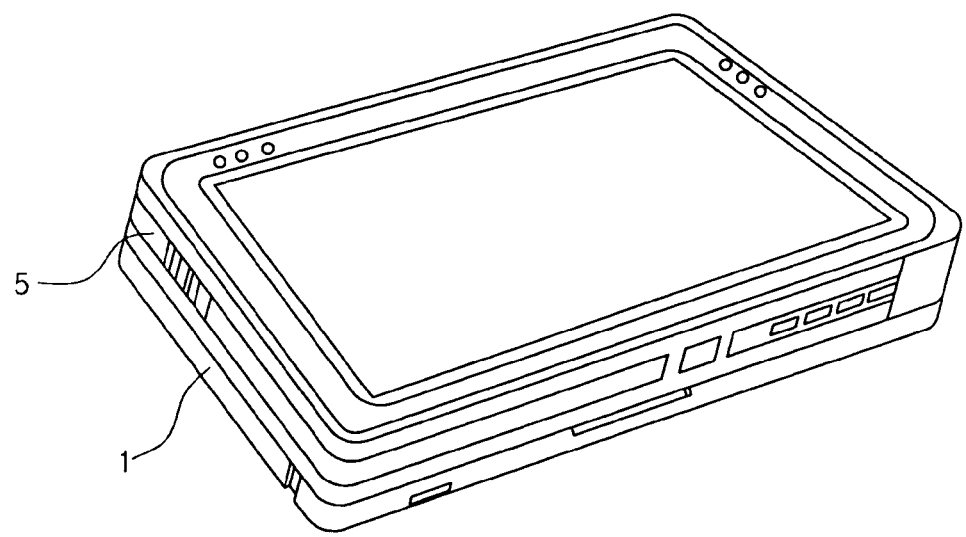
FIG. 1C is a perspective view showing a related art portable electronic device in a state in which a rear surface of a display unit is folded to face a main body according to the related art.
Figure 10A:
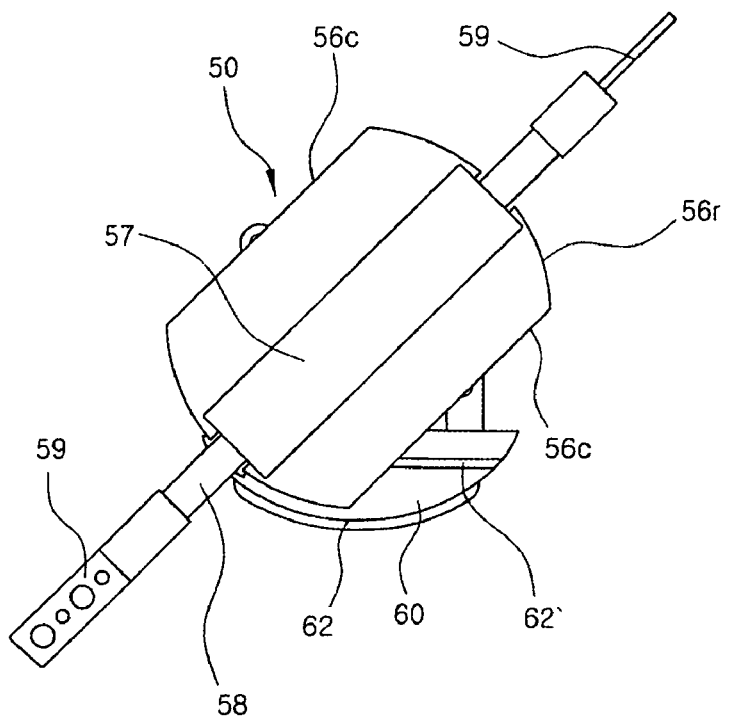
Figure 10B:
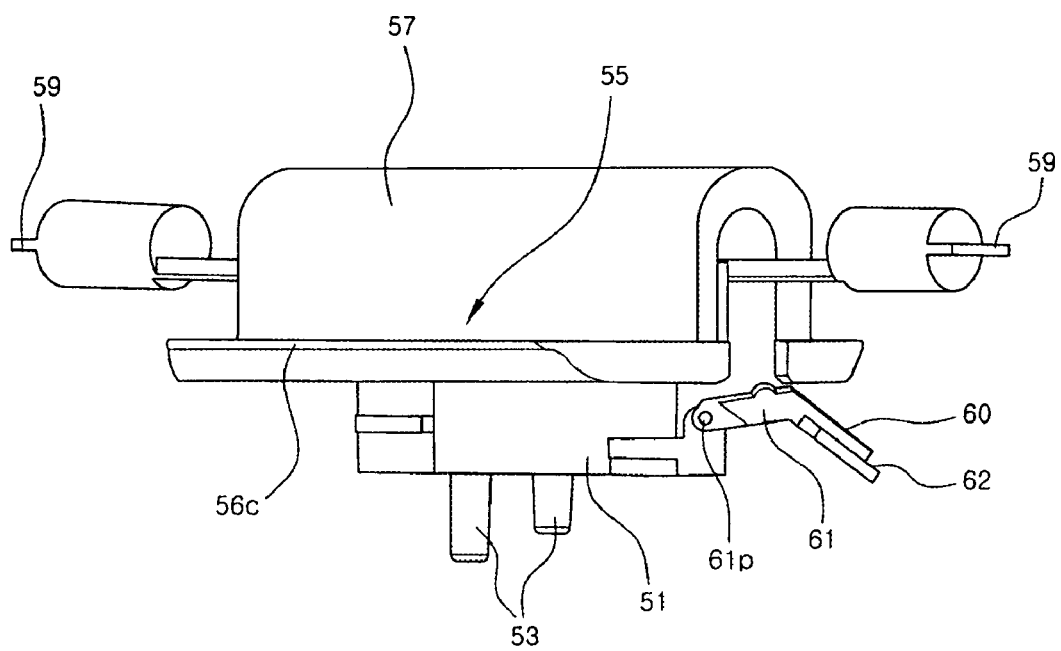

When the display unit 30 is further rotated, the cover plate 60 is pressed down by a bottom surface of the base 56, as shown in FIGS. 10A and 10B. Further, FIGS. 1A and 11B show a state in which the display unit 30 has been rotated 90 degrees. In such a state, the cover plate 60 remains pressed down by the bottom surface of the base 56.

Figure 11A:
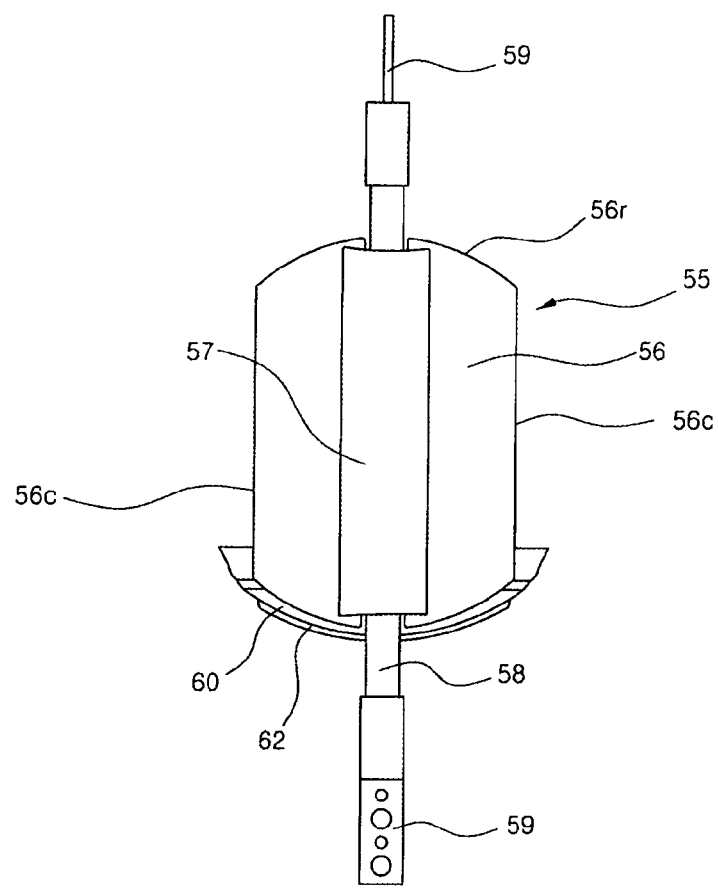
Figure 11B:
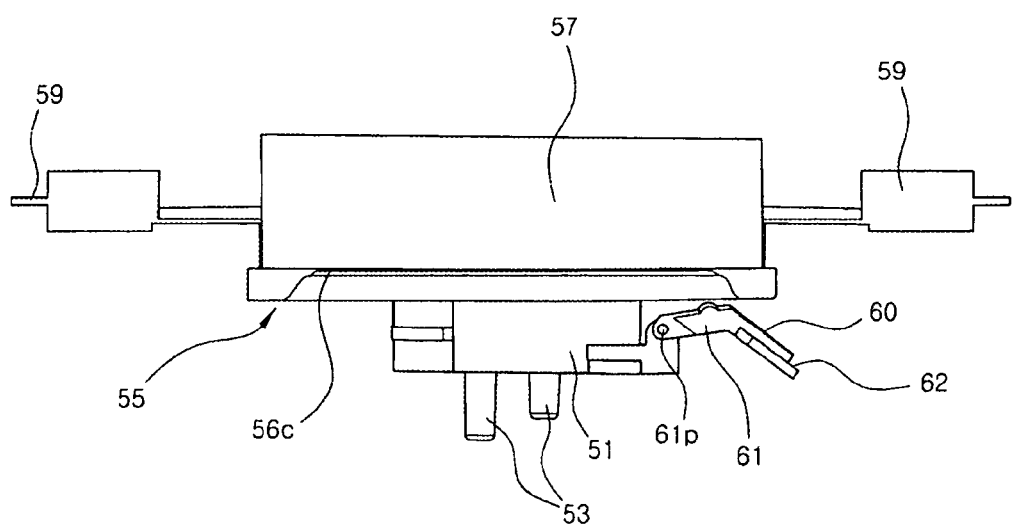

Further, when the display unit 30 is further rotated 90 degrees in a forward or reverse direction from the state shown in FIGS. 11A and 11B, the cover plate 60 is no longer pressed down by the base 56. Thus, the cover plate 60 is restored to an original state by the restoring force and allows the opening of the main body 10 to be covered again.

The invention provides at least the following advantages.

The invention provides an electronic device having a main body which can be used in an inclined state. That is, the input, such as a keyboard, can be inclined by causing the rear end of the main body to be relatively raised using the tilting stand. Therefore, keying operations can be conveniently performed.

The invention also provides an electronic device that fully utilizes spaces in a display unit and a rear portion of a main body.

Further, the invention provides an electronic, device having a swivel hinge assembly that may function as a tablet computer. In such a case, a pen reception portion for receiving an input or stylo pen can be formed in the tilting stand. Therefore, interior spaces of the main body and display unit can be efficiently utilized.

Furthermore, the invention provides an electronic device having a swivel hinge assembly for which undesired rotation of a display unit of the electronic device can be prevented. Since the tilting stand functions to prevent the display unit from being arbitrarily rotated with respect to the main body, particularly when the display unit is folded to face the main body, there is a further advantage in that the usability can be improved.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An electronic device, comprising:
    a main body;
    a display unit rotatably connected to the main body on which information is displayed; and
    a tilting stand rotatably connected to at least one pivot point on a back wall of the main body and configured to adjust a height level of a rear end of the main body, wherein the tilting stand pivots about the at least one pivot point between a position in which it rests on an upper surface of a back end of the main body adjacent a back wall of the display unit and a pivoted position,
    wherein the tilting stand prevents the display unit from being arbitrarily rotated when the display unit is folded to face the main body and the tilting stand is resting on the upper surface of the back end of the main body.

2. The electronic device as claimed in claim 1, wherein the main body comprises at least one input unit.

3. The electronic device as claimed in claim 2, wherein the at least one input unit is provided on an upper surface of the main body.

4. The electronic device as claimed in claim 1, wherein the tilting stand comprises a support bar having a length corresponding to a lateral length of the rear end of the main body.

5. The electronic device as claimed in claim 4, wherein the tilting stand further comprises at least one hinge connection bar extending from the support bar and hingedly connected to the back wall of the main body.

6. The electronic device as claimed in claim 5, wherein the support bar has a width corresponding to a total width of the back wall of at least one of the main body and display unit, and is configured to be rotated about a tip end of the at least one hinge connection bar between the position in which it rests on the upper surface of the back end of the main body adjacent a back wall of the display unit and the pivoted position.

7. The electronic device as claimed in claim 6, wherein a center of rotation of the at least one hinge connection bar is located at a lower portion on the back wall of the main body.

8. The electronic device as claimed in claim 6, wherein the at least one hinge connection bar comprises two or more binge connection bars.

9. The electronic device as claimed in claim 6, wherein the at least one hinge connection bar includes a protrusion configured to mate with one of a plurality of grooves provided on the main body to releasably lock the hinge connection bar in one of a plurality of positions.

10. The electronic device as claimed in claim 1, wherein the titling stand further comprises a pen reception portion configured to receive an input pen by means of which input is entered through the display unit.

11. The electronic device as claimed in claim 1, further comprising:
a swivel hinge assembly for connecting the main body and the display unit and allowing the display unit to be horizontally and vertically rotated.

12. The electronic device as claimed in claim 11, wherein the swivel hinge assembly comprises a first frame fixed to the main body, a second frame which is connected to the display unit and which allows the display unit to be rotated in a substantially horizontal plane about a substantially vertically extending axis with respect to the first frame, and a substantially horizontally extending rotary shaft which allows the display unit to be rotated about a substantially horizontally extending axis of rotation.

13. The electronic device as claimed in claim 1, wherein the electronic device is a portable electronic device.

14. An electronic device, comprising:
a lower body;
an upper body which is connected to the lower body and which can be opened or closed;
a stand hingedly connected to at least one pivot point on a back wall of the lower body, wherein the stand is pivoted to adjust a height level of the lower body and wherein the stand pivots about the at least one pivot point between a position in which it rests on an upper surface of a back end of the lower body adjacent a back wall of the upper body and a pivoted position, wherein the stand prevents the upper body from being arbitrarily rotated when the upper body is folded to face the lower body and the stand is resting on the upper surface of the back end of the lower body.

15. The electronic device as claimed in claim 14, wherein the upper body is a display unit.

16. The electronic device as claimed in claim 14, wherein the stand has the same length as a lateral length of the lower body, and a width corresponding to a thickness of the lower and upper bodies.

17. The electronic device as claimed in claim 14, wherein the stand comprises a support bar having a length corresponding to a lateral length of at least one of the lower body and the upper body, and at least one hinge connection bar extending vertically from the support bar and hingedly connected to the back wall of the lower body.

18. The electronic device as claimed in claim 17, wherein a center of rotation of the at least one hinge connection bar is located at a lower portion on the back wall of the lower body.

19. The electronic device as claimed in claim 17, further comprising a longitudinal hole into which a stylus pen can be inserted formed in one end of the support bar.

20. The electronic device as claimed in claim 17, wherein a shock-absorbing member configured to perform a shock-absorbing operation upon contact with a surface on which the electronic device is positioned is provided on the support bar.

21. The electronic device as claimed in claim 17, wherein the at least one hinge connection bar includes a protrusion configured to mate with one of a plurality of grooves provided on the lower body to releasably lock the hinge connection bar in one of a plurality of positions.

22. The electronic device as claimed in claim 14, further comprising a swivel hinge assembly configured to connect the lower body and the upper body and configured to allow the upper body to be horizontally and vertically rotated with respect to the lower body.

23. The electronic device as claimed in claim 22, wherein the swivel hinge assembly comprises a first frame fixed to the lower body, a second frame connected to the upper body and which allows the upper body to be rotated in a substantially horizontal plane about a substantially vertically extending axis with respect to the first frame, and a substantially horizontally extending rotary shaft which allows the upper body to be rotated about a substantially horizontally extending axis.

24. The electronic device as claimed in claim 14, wherein the electronic device is a portable electronic device.

* * * * *